(12) United States Patent
Sala

(10) Patent No.: US 6,478,520 B1
(45) Date of Patent: Nov. 12, 2002

(54) SELF-THREADING SCREW FOR METAL WITH SIX FORMERS OF PRISMATIC SHAPE

(76) Inventor: Carlo Sala, Via Roma 101, 27025 Gambolo' (Province of Pavia) (IT)

( * ) Notice: Subject to any disclaimer, the term of this patent is extended or adjusted under 35 U.S.C. 154(b) by 0 days.

(21) Appl. No.: 09/539,547

(22) Filed: Mar. 31, 2000

(30) Foreign Application Priority Data

Apr. 2, 1999 (IT) .......................................... MI99A0967

(51) Int. Cl.⁷ .......................... A16B 25/00; A16B 39/30
(52) U.S. Cl. .................... 411/386; 411/311; 411/387.4; 411/418
(58) Field of Search ................................. 411/310, 311, 411/386, 418, 420, 421, 393, 387.4

(56) References Cited

U.S. PATENT DOCUMENTS

| | | | | |
|---|---|---|---|---|
| 3,390,410 A | * | 7/1968 | Bridges | 411/418 X |
| 3,426,642 A | | 2/1969 | Phipard | |
| 3,527,136 A | * | 9/1970 | Wilson | 411/386 X |
| 4,069,730 A | * | 1/1978 | Gutshall | 411/386 |
| 4,259,889 A | | 4/1981 | Capuano | |
| 4,764,068 A | * | 8/1988 | Crispell | 411/393 |
| 5,044,853 A | * | 9/1991 | Dicke | 411/311 |
| 5,385,439 A | * | 1/1995 | Hurdle | 411/311 X |

* cited by examiner

*Primary Examiner*—Neill Wilson
(74) *Attorney, Agent, or Firm*—Hedman & Costigan, P.C.

(57) ABSTRACT

Described herein is a self-threading screw, designed to be inserted in a hole of appropriate size made in a sheet of metal (or other metallic body), which has at the free end of its shank six projections ("formers" or "shapers") of prismatic shape designed to thread by rolling the wall of the hole in which the screw itself is inserted.

Figure 2:
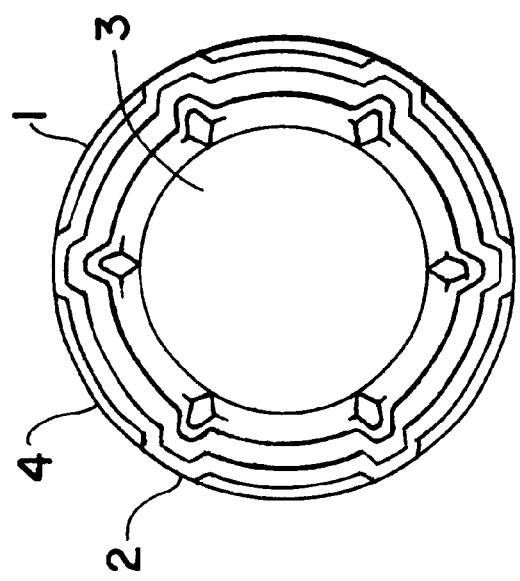

5 Claims, 1 Drawing Sheet

SELF-THREADING SCREW FOR METAL WITH SIX FORMERS OF PRISMATIC SHAPE

SCOPE OF THE INVENTION

The invention is represented by a self-threading screw, designed to be inserted in a hole of appropriate size made in a sheet of metal (or other metallic body), which has at the free end of its shank six projections ("former" or "shapers") of prismatic shape designed to thread by rolling the wall of the hole in which the screw itself is inserted.

PRIOR ART

Self-threading screws (i.e., screws designed to make on the wall of the hole in which they are inserted a thread having a profile complementary to that of the thread present on the shank of the screw) have been known for a long time, are widespread on the market and widely used in technical applications to join together metal sheets or pieces made of a metallic material. With traditional self-threading screws the operation of inserting the screw in the corresponding hole is somewhat troublesome because it is necessary to force the thread of the screw into the wall of the hole to make the required thread; in addition, these screws are not suitable for being used either as adjusting screws or for precision fits, or as means of reversible joining because screwing and re-screwing the screw generally causes a rapid stripping of the thread of the hole. To overcome such drawbacks, various types of self-threading screws have been proposed, which differ from one another according to shape and mode of operation: just to provide a non-limiting example, self-tapping screws are cited (characterized by the presence of longitudinal grooves for discharging the material removed) and screws with three-lobed section and rounded tips. In particular, self-threading screws have been proposed the shank of which presents, at the free end, at least one former of prismatic shape designed to roll the material making up the body to be threaded, so obtaining along the wall of the hole (without any need for further machining) a very resistant complete thread, the turns of which have the fiber intact and slightly hardened by the compression generated by their forming.

In addition, the at least one former of prismatic shape reduces the friction between the thread of the screw and the wall of the hole to be threaded, consequently reducing the effort required for inserting and screwing the screw in the hole; the rolled material, by its relaxation around the screw, increases the coefficient of back-off friction and makes an external thread-internal thread fit that is (rather) precise because the internal thread assumes the profile and the dimensions of the screw.

Available on the market are self-threading screws which have four former of prismatic shape, which have proved able to satisfy a fair share of the technical needs of the market; the use of these screws has proved particularly advantageous for assembling items made of thin sheet metal or other metallic material by means of manual, automatic or semi-automatic systems with high production rates.

Studies and experimental tests conducted by the Applicant have surprisingly made it possible to note that:

the performance (already good) obtained using the above-mentioned known self-threading screws are further improved by increasing the number of former of prismatic shape present at the free end of the shank of the screw from four to six;

a further increase in the number of the former does not further improve the performance obtainable using these self-threading screws but, on the contrary, entails non-negligible constructional and functional problems, due in the first place to the difficulty of locating eight (or more) former along the external circumference of the free end of the shank of the screw.

SUMMARY OF THE INVENTION

The subject of the present invention is a self-threading screw for metal comprising six former of prismatic shape set at regular intervals along the external circumference of the free end of the shank of the screw. Preferably but not necessarily, the former have an elongated shape, are parallel to the axis of symmetry of the shank of the screw and are made on the last few turns (from three to five, preferably three) of the thread made on the shank of the screw, adjacent to the free end of the shank.

LIST OF FIGURES

Figure 1:
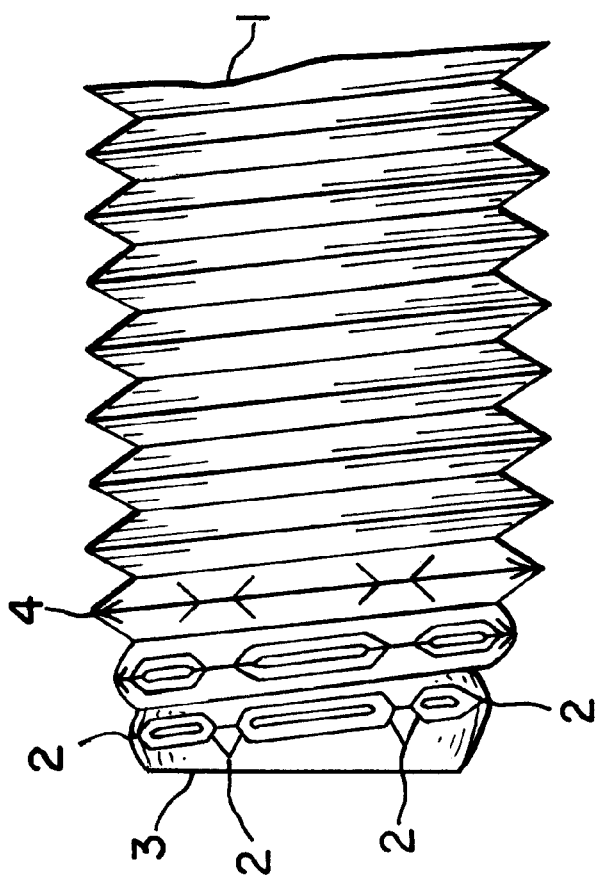

The invention will now be described in greater detail with reference to a preferred example of the embodiment, of a non-limiting nature, illustrated in the attached figures, where:

FIG. 1 is a schematic front view of the end of the shank of a self-threading screw made according to the invention; and FIG. 2 is a schematic side view of the screw of FIG. 1, with the aim of better highlighting the six former.

In the attached figures, corresponding elements will be identified by the same reference numbers.

DETAILED DESCRIPTION OF THE INVENTION

FIG. 1 illustrates a schematic front view of the end of the threaded frustoconical free end portion 3 of a shank 1 of a self-threading screw for metal, made according to the invention, which consists of six former 2 of prismatic shape (two of which are not shown in FIG. 1 because they are hidden by shank 1). Each of the six former is set at regular intervals extending along and being integral with portions of the threaded length within the external circumference of the threaded frustoconical free end 3 of the shank 1. The six former are arranged such that they are spaced in a substantially circumferentially equidistant relationship relative to each other on the forming thread. The tips of the former extend above the remaining crest portions of the respective threads. The prismatic or triangular shape of the former has an apex which is substantially perpendicular to the forming thread. These former are shaped substantially as a triangular pyramid where one plane abuts and is a part of the shank of the self-threading screw and the other planes extend outwardly from the shank. As the planes of the prism protruding from the frustoconical free end of the shank 3 taper away from each other the former extends from each thread turn while losing its triangular shape, altering the prism from two exterior planes to three. The three exterior planes of the former which start on the first thread turn and continue on the second, extend out from the thread in alignment to shape the former.

The six former are seen more clearly in the side view of FIG. 2, where just one former is identified by the reference number "2" for reasons of simplicity of graphical representation.

In a preferred embodiment, an ideal segment traced in FIG. 2 between the vertices of two adjacent former 2 does not touch the free end 3 of the shank 1: this fact reduces the friction between the external screw and the internal screw at the moment of the formation of the internal screw itself.

In the example of the embodiment illustrated in the attached figures, the end of the shank 1 has a slightly tapered shape to form a "lead-in" which facilitates entrance of the screw into the corresponding hole: starting from the frustoconical free end 3 of the shank 1, the last three turns of the thread 4 present a progressively increasing diameter and a less rounded profile, whilst the three areas of prismatic shape which constitute each of the former 2 have an increasing width, as may readily be noted from FIG. 2.

According to a further embodiment of the invention, not illustrated in the attached figures for reasons of simplicity of graphical representation, the six former 2 of prismatic shape are set at regular intervals exclusively along the external circumference of the free end 3 of the shank 1, without involving the last turns of the thread 4 made on the shank 1, adjacent to the frustoconical free end 3 of the shank 1. The improvements in the performance of a screw according to the invention, which comprises six former of prismatic shape, if compared to the performance of a screw comprising four former of prismatic shape will emerge clearly from the comparative test described in the following example.

EXAMPLE 1

Two series of tests were carried out to measure the threading load using screws of the type M6, thread ISO 5542-65, SN slotted cheese-headed screw, comprising four former of prismatic shape and six former of prismatic shape.

The tests were conducted according to the UNI 7323.6 Standards—March 1994, by inserting ten screws with four former and ten screws with six former in holes having a diameter of 5.5 mm made using a helical drill bit in an extra-mild steel plate (hardness: HRB: 70–85, HB: 125–165) having a thickness of 6 mmm. The values found are shown in the following table:

| Test No. | four form. (N*cm) | six form. (N*cm) |
|---|---|---|
| 1 | 600 | 300 |
| 2 | 580 | 310 |
| 3 | 560 | 280 |
| 4 | 600 | 270 |
| 5 | 610 | 280 |
| 6 | 590 | 300 |
| 7 | 570 | 300 |
| 8 | 600 | 310 |
| 9 | 550 | 300 |
| 10 | 590 | 300 |

From the above-mentioned table it may be noted that, for a screw with six former, the mean threading load is approximately 295 N*cm whilst the mean threading load for the corosponding screw with four former is approximately 585 N*cm. consequently,for screw with six former the mean threading load is:

- approximately half of that for a screw with four former;
- approximately 35–37% of the tightening load indicated in the UNI Standards (800–840 N*cm), whilst for a screw with four former this ratio rises to approximately 70%–73%;

For a screw with six former the threading operation is therefore so easy as to be very advantageous both in the case of manual assembly (the risk of the operator suffering from tendinitis and/or strain to the upper limbs is reduced) and in the case of assembly by means of an automatic machine (the consumption of the tools for screwing is reduced).

It has moreover been found that the tearing (or stripping) load of a screw with six by approximately 20% that of the corresponding screw with four former.

Again departing from the scope of the invention it is possible for a person skilled in the branch to make to the self-threading screw for metal with six former of prismatice which forms the subject of the present description all the modifications and improvements suggested by normal experience and by the natural evolution of techniques.

I claim:

1. A self-threading screw for metal, with thread extending along a shank to a frustoconical free end, wherein said screw comprises six former of prismatic shape each of said former being set at regular intervals extending along and being integral with portions of the thread turns within the external circumference of the threaded shank, and wherein the tips of the former extend above the remaining crest portions of the respective thread turns.

2. A self-threading screw according to claim 1, wherein each of said six former has an apex of prism shape comprising two exterior planes at a frustoconical free end of said shank and maintains an elongated shape as it extends along said shank by an extension having three exterior planes integral with a subsequent thread turn having an alignment integral with each other and parallel to the axis of symmetry of said shank and adjacent to said frusticonical free end.

3. A self-threading screw according to claim 2, wherein each of said six former is integral and adjacent with said frustoconical free end integral with thread turns one through three or thread turns one through five of said shank.

4. A self-threading screw according to claim 3, wherein each of said six former is made on said frustoconical free end and thread turns one, two and three of said shank.

5. A self-threading screw according to claim 4, having an ideal segment traced between the vertices of two adjacent former does not touch said frustoconical free end of said shank and wherein said six former, upon contact with a corresponding hole facilitates entrance of said screw.

\* \* \* \* \*